United States Patent [19]

Roch

[11] 3,874,260

[45] Apr. 1, 1975

[54] CORNER SHEARED BLANK CONVEYING APPARATUS AND METHOD

[75] Inventor: Gerald V. Roch, Indianapolis, Ind.

[73] Assignee: Hurco Manufacturing Company, Inc., Indianapolis, Ind.

[22] Filed: Oct. 31, 1973

[21] Appl. No.: 411,335

[52] U.S. Cl.................... 83/27, 83/155, 83/157, 83/373, 83/380
[51] Int. Cl................................................ B26d 7/02
[58] Field of Search ............ 83/155, 157, 277, 373, 83/380, 27, 104

[56] References Cited
UNITED STATES PATENTS

| | | | |
|---|---|---|---|
| 2,933,966 | 4/1960 | Dehn | 83/373 |
| 3,260,145 | 7/1966 | Giordano | 83/157 X |
| 3,691,887 | 9/1972 | Roch | 83/277 |
| 3,793,916 | 2/1974 | Jarmon | 83/157 X |

Primary Examiner—J. M. Meister
Attorney, Agent, or Firm—Woodard, Weikart, Emhardt & Naughton

[57] ABSTRACT

A conveyor is adjacent the intersecting lower blades of a corner shearing machine, to support a portion of sheet metal to be sheared. The sheet is clamped to the tops of the lower blades immediately outside the cutting edges. The conveyor is then tipped downward, accommodating the downward movement of the upper shearing blades, but receiving the sheared blank thereon and conveying it away from the blades. As the upper shearing blades rise, so does the conveyor for reception of another portion of the sheet thereon, to be sheared from the sheet. A diagonal actuator is provided to open scrap slots for discharge of scrap strips downward past the conveyor.

6 Claims, 10 Drawing Figures

CORNER SHEARED BLANK CONVEYING APPARATUS AND METHOD

BACKGROUND OF THE INVENTION

1. Field of the Invention

This invention relates generally to shearing machines and more particularly to a method and apparatus for removing finished blanks as sheared from a sheet.

2. Description of the Prior Art

The most pertinent prior art known to me for this particular purpose is shown and described in my U.S. Pat. No. 3,691,887 issued Sep. 19, 1972 and entitled AUTOMATIC SHEARING METHOD AND APPARATUS. In that patent there is a conveyor disposed below the movable upper blades of a shearing machine and sufficiently far below those blades to enable them to close with the stationary lower blades and shear a corner out of the sheet material, without interference between the blades and conveyor. When a fairly large blank is to be sheared from a sheet, the portion suspended over the conveyor will tend to droop, and for some purposes, this should be avoided. There is a U.S. Pat. No. 923,109 issued May 25, 1909 to F. G. Biggert, Jr. and which shows a roller conveyor type of shear table having a portion linearly movable toward and away from a lower shear blade. It is tiltable upwardly to the edge of the lower blade, to receive sheared pieces. It can be lowered during shearing to accommodate downward movement of the upper blade, and can be moved linearly away from the blade to permit crop ends to drop through the space between the table and the lower shear blade. However it will not preclude the aforementioned drooping of a large blank. The present invention avoids it.

SUMMARY OF THE INVENTION

Described briefly, in a typical embodiment of the present invention, a conveyor is disposed below the upper blade assembly and immediately adjacent the lower blades of a corner notching shear. The conveyor is arranged and controlled so that when the sheet of material to be sheared is moved into position for shearing, the conveyor top is horizontal and the sheet is supported on the conveyor. When the machine clamps the sheet, the conveyor is lowered to accommodate and provide clearance for the downward movement of the upper blade assembly. When the cut is completed, the sheared blank is conveyed away; the conveyor is raised to its original position; and the sheet is unclamped; and moved into position for the next cut. The sheet is then clamped; the conveyor is depressed, and the upper blades are closed with the lower blades to shear the next blank. The conveyor is shiftable horizontally to provide for by-passing of the conveyor by sheared scrap strips.

2

DESCRIPTION OF THE PREFERRED EMBODIMENT

Figures 1, 2:
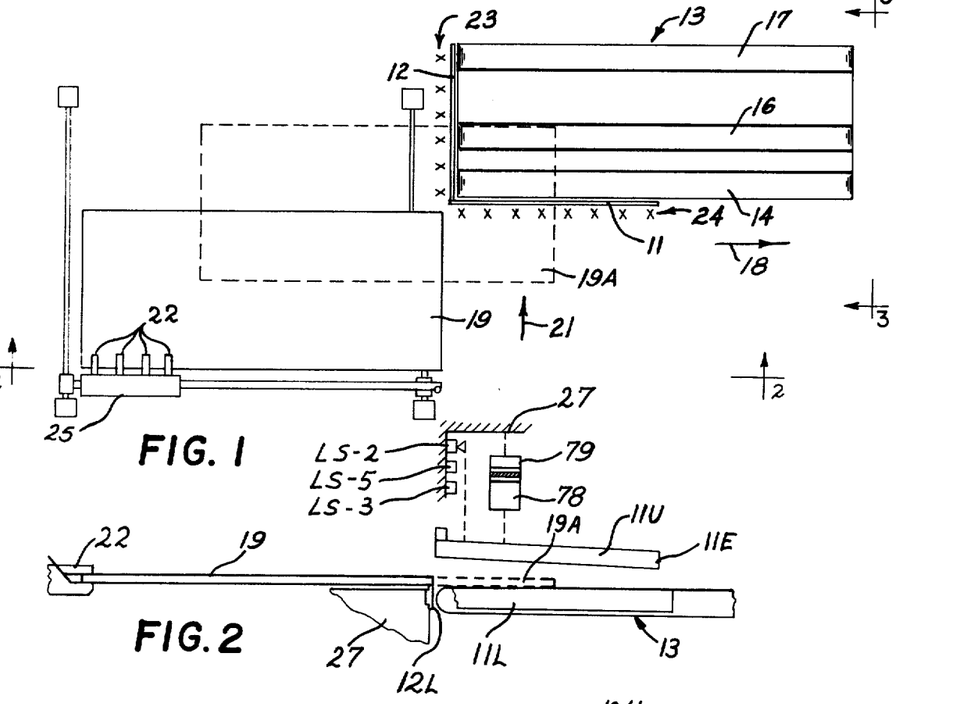
FIG. 1 is a schematic top plan view of a corner notching shearing machine, showing in solid outline, the original position of a sheet to be sheared, and showing by the dotted outline a position of the sheet for shearing.
FIG. 2 is a schematic diagram taken at line 2—2 in FIG. 1 and viewed in the direction of the arrows, and also showing an upper blade actuating cylinder not shown in FIG. 1 or the other views, except for FIG. 9.

Referring now to the drawings in detail, FIG. 1 shows schematically the front blade 11 and side blade 12 of a corner notching shear, and a conveyor assembly 13 associated therewith and having belts thereon at 14, 16 and 17, to convey sheared blanks in the direction of arrow 18. A sheet of material to be sheared is shown at 19 in the solid line, and is shown at 19A in a dotted line indicating one possible position to which it can be moved for shearing by blades 11 and 12. Grippers are represented schematically at 22 and these may be mounted to a carriage 25 of the type described in my aforementioned patent, for movement of the sheet in both the "X-axis" direction of arrow 18 and the "Y-axis" direction of arrow 21 to the position desired for shearing. Hold-down clamps are represented schematically at 23 in front of the Y-axis side blade, and at 24 in front of the X-axis front blade. These serve to clamp the sheet to the upper faces of the lower blades 12L and 11L respectively, and thereby to the base of the machine, during the shearing operation.

Figure 3:
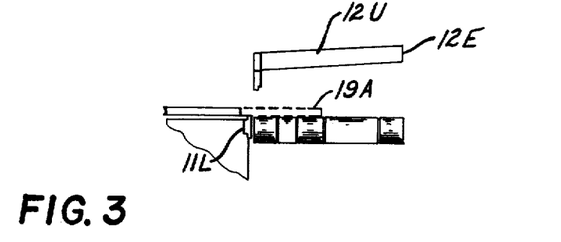
FIG. 3 is a schematic diagram taken at line 3—3 in FIG. 1 and viewed in the direction of the arrows.
Figure 4:
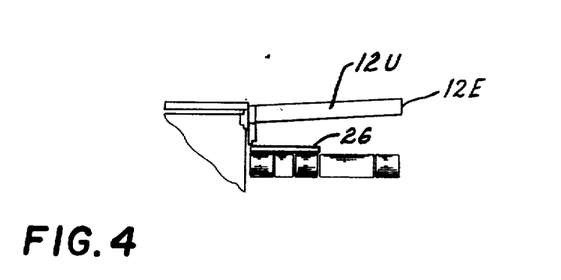
FIG. 4 is a schematic diagram like FIG. 3 but showing the blades closed, the conveyor depressed, and the sheared blank on the conveyor.

Referring now to the illustration of FIG. 2, the lower front blade 11L shown fragmentarily, is a straight horizontal blade, and the upper front blade 11U is inclined, the illustration being exaggerated to show the rake on the blade upward from the right-hand side toward the left. The upper side blade 12U also has a rake thereon as best shown in FIGS. 3 and 4. This rake enables slitting the sheet rather than complete corner shearing thereof, by 11U, by operating the half-stroke drive cylinder 79 therefore.

FIG. 3 shows the conveyor in the normal raised position where it is immediately adjacent to and behind the lower front blade 11L. This view also shows by the dotted line 19A, the dotted line position of the sheet portion to be sheared, corresponding to FIG. 1. In these views, the thickness of the sheet is shown much greater than it would be if in scale with the other dimensions.

FIG. 4 shows the upper blades in the fully lowered position by which they shear a corner in the sheet, resulting in the blank 26 being deposited on the conveyor which is shown in the lowered depressed position.

Figure 5:
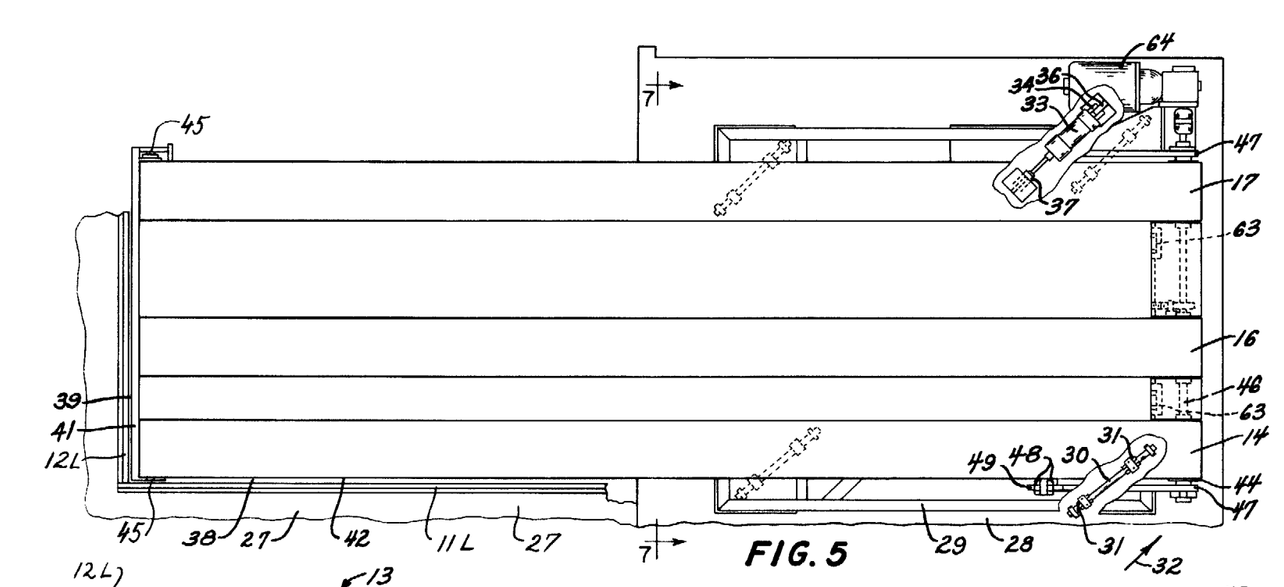
FIG. 5 is an enlarged top plan view of the lower blades of the shearing machine, with the ends thereof broken away, and the conveyor assembly associated therewith.
Figures 6, 7:
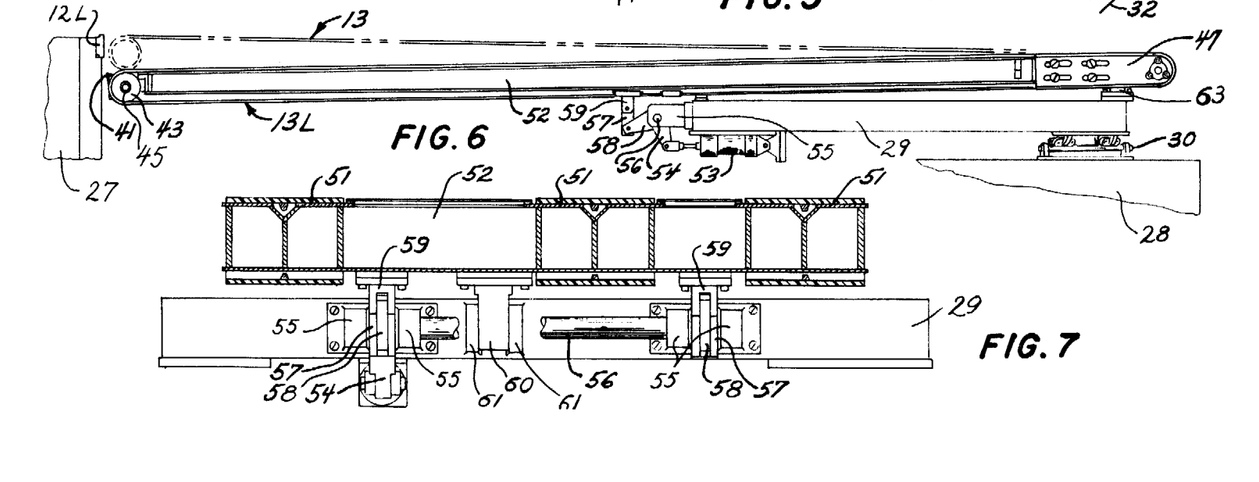
FIG. 6 is an elevational view of the structure shown in FIG. 5.
FIG. 7 is a further enlarged section taken at line 7—7 in FIG. 5 and viewed in the direction of the arrows.
Figure 8:
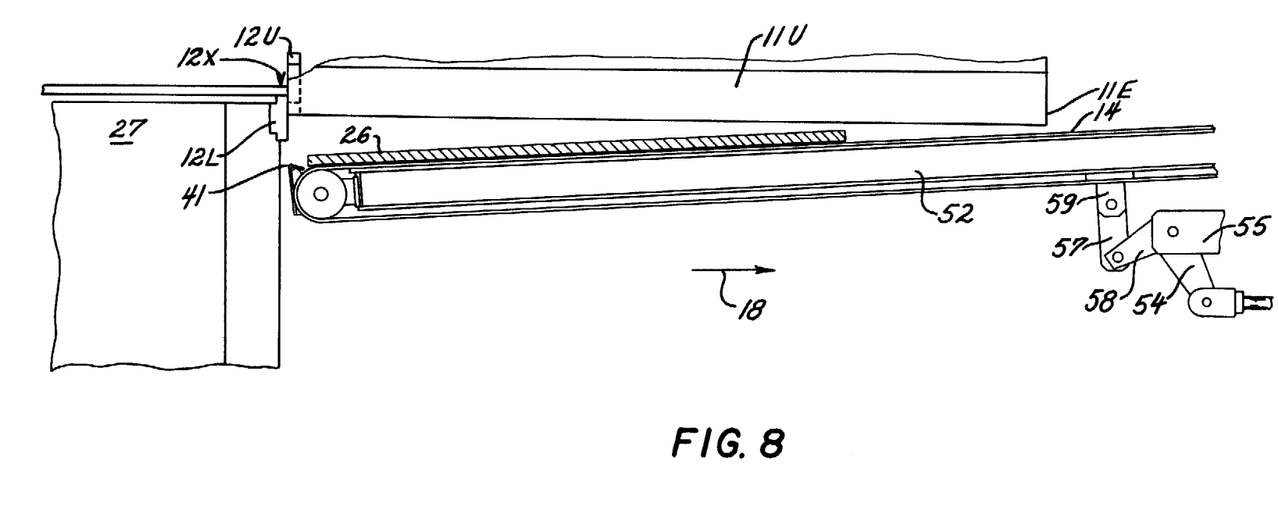
FIG. 8 is an enlargement of a portion of FIG. 6, and showing the blades fully closed.

Referring now to FIGS. 5, 6 and 8, the lower front and side blades can be considered affixed to a base shown generally at 27. A conveyor mounting base 28 is affixed to the shear base 27, and a conveyor mounting carriage 29 is mounted to the conveyor base 28 by four sets of linear guide assemblies, one at each corner of the carriage 29, one of them being shown in solid lines in FIGS. 5 and 6 and the others being shown by dotted lines in FIG. 5. As an example, a Thomson rod 30 may be affixed to the base 28, and a pair of bearing assemblies 31 mounted thereto may be affixed to the carriage 29. Such apparatus is marketed by Thomson Industries, Inc., of Manhassett, N.Y. This mounting of the carriage assembly enables the shifting thereof in direction of arrow 32 away from its normal position shown, by means of a hydraulic cylinder 33 having one end thereof connected through a yoke 34 and pin 36 to the base 28, with the yoke 37 on the end of the cylinder rod being connected to the carriage. Approximately a 3 inch stroke is provided and serves to move the conveyor assembly on the diagonal of the corner formed by the blades 11 and 12 to open a scrap slot. This permits pieces of sheet which are sheared off during squaring operations, or at the completion of a complete shearing cycle, to drop vertically past the front and side edges of the conveyor at 38 and 39, respectively, into a scrap bin below. This is described briefly in my aforementioned patent. The normal spacing between the edge plate 41 of the conveyor assembly and the lower side blade 12L is approximately one eighth inch. The normal spacing between the front edge of the conveyor 42 and the lower front blade 11L is approximately one sixteenth inch. The cylinder 33 serves to open this spacing in accordance with the 3 inch stroke on the diagonal, to provide ample space for scraps sheared from the stock to fall past the conveyor during squaring operations or at the completion of a shearing cycle.

As shown in FIG. 6, the conveyor can be tipped from the position shown at 13 to the position shown at 13L. In this latter position, as better shown in FIG. 8, the upper face of the belt 14 is approximately three quarters inch below the lowermost position reached by the right-hand end 11E of the upper front blade, when it is fully lowered. At this time, the upper end 12E of the upper side blade 12U (FIG. 4) has closed with the lower side blade 12L to enable the completion of a cut along a corner. Therefore with the conveyor in this depressed condition, there is no interference whatever between the top of the conveyor and the upper blades, and yet the conveyor remains close enough to the lower front and side blades to avoid by-passing of the sheared blank from the conveyor into a scrap bin (not shown) below the conveyor. So the blank is deposited on belt 14 and the belts 16 and 17 (depending upon the dimensions of the blank) and is conveyed to the right (FIG. 8) in the direction of arrow 18 for removal by hand or by an automatic stacking machine.

The belts run between pulleys such as pulleys 43 and 44 for belt 14. Pulley 43 is mounted on shaft 45, and pulley 44 is mounted on shaft 46. Similar pulleys are provided on these shafts for the other two belts. Shaft 46 is supported in bearings located at spaced points along its length and in side plate 47. Although the bearings supporting shaft 45 are mounted directly on the conveyor frame assembly 52, the bearings supporting shaft 46 are mounted to movable members such as side plates 47, mounted to frame assembly 52 but adjustable by nuts 48 on screws 49 on both sides to move shaft 46 toward or away from shaft 45 to establish the desired belt tension. As best shown in FIG. 7, the upper rungs of the belts are supported on plates such as 51 which are an integral portion of the tilting conveyor frame assembly 52.

The tilting action is obtained by means of a hydraulic cylinder 53 secured to the underside of the carriage 29 and connected by one arm 54 of a double arm elevator crank. The crank is secured to a rock shaft 56 having each end mounted in bushings in a pivot clevis 55 affixed to the carriage 29. The other arms 58 of the crank are connected to an elevator link 57 connected to an elevator link clevis 59 affixed the underside of the conveyor frame 52. Similarly, the arms 58 of another crank at the other end of the rock shaft are connected to another elevator link 57 connected to another elevator link clevis 59 affixed the conveyor frame. Therefore, when the cylinder has retracted the piston, the conveyor frame 52 is tilted downward about a horizontal pivot axis through a pair of pivot blocks 63 at the right hand end thereof (FIGS. 5 and 6) to the position 13L (FIG. 6 and 8). When the cylinder has extended the piston rod, the conveyor frame is tilted upward to the position shown by the reference numeral 13 (FIG. 6). The stabilizer bar 60 affixed to the conveyor frame 52, is laterally guided between guide bars 61 affixed to the carriage 29.

During positioning of material, the conveyor is up and, as shown in FIG. 2, the sheet material, as moved by the grippers 22 (FIG. 1) connected to an X–Y positioning carriage 25, rests upon and is slid along the upper edge of the lower blades 11L and 12L, and onto the conveyor belts. Normally these belts are moving being driven by the drive motor 64 (FIG. 5) which drives the shaft 46. Because the grippers are controlling the sheet, the motion of the belts does not move the sheet, and the belts serve merely to support the sheet so that it does not droop with respect to the cutting edges of the lower blades, these cutting edges being the inner edges (i.e., inside the corner) behind which the conveyor is disposed. Then the sheet is clamped to the base of the shearing machine, but more specifically is clamped against the upper faces of the lower front and side blades by holddown clamps as indicated schematically in FIG. 1, these clamping points being immediately in front of the shearing edges of the lower front and side blades as at 12X for lower side blade 12L in FIG. 8. Then the upper blades can be driven downwardly. It is normally contemplated that they both be driven simultaneously by hydraulic drive means. The specific mechanism for accomplishing this can vary somewhat, and in fact the blades can be driven separately, if desired. For simultaneous drive thereof, one means is shown in my aforementioned patent. Another means shown in FIGS. 2 and 9 herein involves cylinders 78 and 79 secured together back-to-back, with the piston stroke of cylinder 78 being twice that of cylinder 79, and the piston rod of 78 connected to the blades, and the piston rod of cylinder 79 connected to the machine frame. So, in this example, both the upper front and upper side blades 11U and 12U respectively are driven simultaneously. Immediately before or during the downward drive of the upper blades, the piston rod is retracted in the tipping cylinder 53 under the conveyor, so that the upper surface of the belt 14 clears the upper front blade, and the conveyor end edge plate 41 clears the upper side blade.

Figure 9:
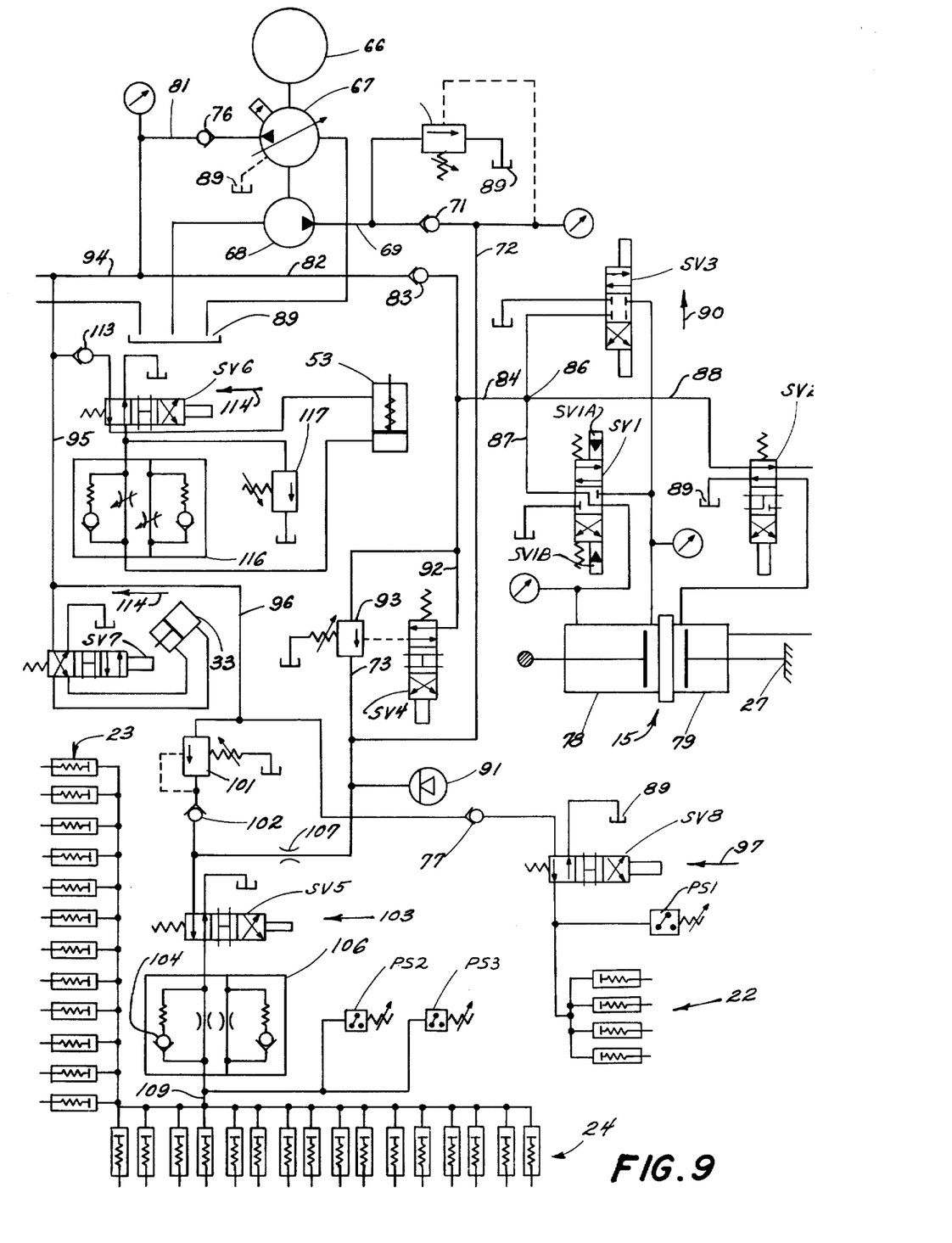
FIG. 9 is a schematic diagram of control circuitry.

Referring now to FIG. 9, a motor 66 drives a hydraulic pump 67 and another hydraulic pump 68. Pump 68 supplies hydraulic fluid at about 2,000 p.s.i., through line 69, check valve 71, line 72, line 73 to valve 93. Pump 67 supplies hydraulic fluid at about 1,000 p.s.i. through the check valve 76, lines 81, 82, 94, and 95 to several branches of the system.

The upper blade ram drive cylinder assembly 15 is shown having two cylinders therein, each with a piston therein, the piston in cylinder 78 being connected to the ram to which the upper blades are affixed, and the piston in cylinder 79 being connected to the shear frame 27. Normally, pressure is applied to the rod ends of both cylinders by hydraulic fluid supplied from pump 67 through lines 81, 82 and check valve 83, line 84 to junction 86, and through line 87, and through solenoid valve SV1 to the rod end of the cylinder 78; and through line 88 from junction 86, and through solenoid valve SV2, to the rod end of cylinder 79.

To obtain a half stroke of the ram, for slitting operations, valve SV2 is shifted fully in the direction of arrow 90 to apply pump pressure at the head end of the piston in cylinder 79, venting the rod end to sump at 89. After the half stroke, valve SV2, is returned to the original position shown, the rod end filled, and the ram retracted. To obtain full stroke actuation of the ram, which closes both the upper blades with their respective lower blades, valve SV1 is shifted opposite the direction of arrow 90. Thereby the head end of chamber 78 is filled and the rod end vented to sump. By reversing valve SV1, the head end is again vented as the rod end is filled, to raise the ram and open the blades.

So it is seen that operation of valve SV2 serves to close only the upper front blade 11U with lower front blade 11L for slitting operation of a type described in my aforementioned patent, while operation of valve SV1 causes closure of both the upper front blade 11U with lower front blade 11L, and upper side blade 12U with lower side blade 12L.

To enable jogging the ram by the use of the cylinder 78, the solenoid valve SV3 is employed and can be shifted fully in the direction of arrow 90, to apply pressure at a thousand pounds per square inch from pump 67 to the head end of the piston in cylinder 78. In the event it is ever desired to apply two thousand pounds pressure from pump 68 to one or the other of the cylinders, the solenoid valve SV4 can be shifted in the direction of arrow 90 to allow the higher pressure stored in accumulator 91 to be applied through the valve SV4, lines 92 and 84, and junction 86 to one or more of the three solenoids SV1, SV2, and SV3. A pressure relief valve is provided at 93.

The sheet grippers 22 are supplied with hydraulic fluid from the pump 67, to lines 81, 94, 95, 96, check valve 77, and solenoid valve SV8. This valve normally applies the hydraulic fluid to the grippers to cause them to grip the sheet. When this valve is shifted in the direction of arrow 97, the pressure is vented to sump 89, and the grippers are released under the action of the springs illustrated schematically therein to release the sheet of stock.

The X axis and Y axis clamps 24 and 23, respectively, can be supplied with hydraulic fluid at low pressure from lines 94, 95, 96, pressure relief valve 101, check valve 102, and solenoid valve SV5, when that valve is shifted in the direction of arrow 103. When the valve is in the normal position shown, the springs illustrated schematically in the clamping cylinders, release the clamps and thereby release the sheet stock, and return hydraulic fluid through the spring loaded one way check valve 104 in the flow control unit 106 to sump 89. Once the clamps have been applied by shifting the solenoid valve SV5 in the direction of arrow 103, the high pressure is applied from line 72 through the orifice 107 and solenoid valve SV5. As the pressure rises at the downstream side of the controller 106 on the feeder line 109 to the various clamp cylinders, the rise is detected by pressure operated switches PS2 and PS3, having adjustable switch points as indicated by the arrow through the return springs thereon.

Pressure from pump 67 on lines 81 and 94 is applicable through check valve 113 and solenoid valve SV6 to the rod end of the tipping cylinder 53 to aid gravity or spring load to depress or tip downward the end of the conveyor immediately behind the shear blades. To raise the conveyor to position for receipt of the sheet as moved by the grippers 22, the valve SV6 is shifted in the direction of arrow 114, whereupon it applies hydraulic fluid from pump 67 through the flow controller 116 and the adjustable orifice therein to the head end of cylinder 53, thus raising the conveyor. A pressure relief valve is provided at 117 to limit the pressure applied to the up direction on cylinder 53.

To horizontally retract the conveyor for opening the scrap slots, the solenoid valve SV7 is supplied with hydraulic fluid from line 81, 94, and 95, and applies hydraulic pressure to the rod-end of the conveyor or retract cylinder 33. To return the conveyor, solenoid valve SV7 is shifted in the direction of arrow 114 to thereupon apply hydraulic fluid to the head end of the cylinder, extending the piston rod thereof and returning the conveyor to its normal original position, closing the scrap slot.

OPERATION

Figure 10:
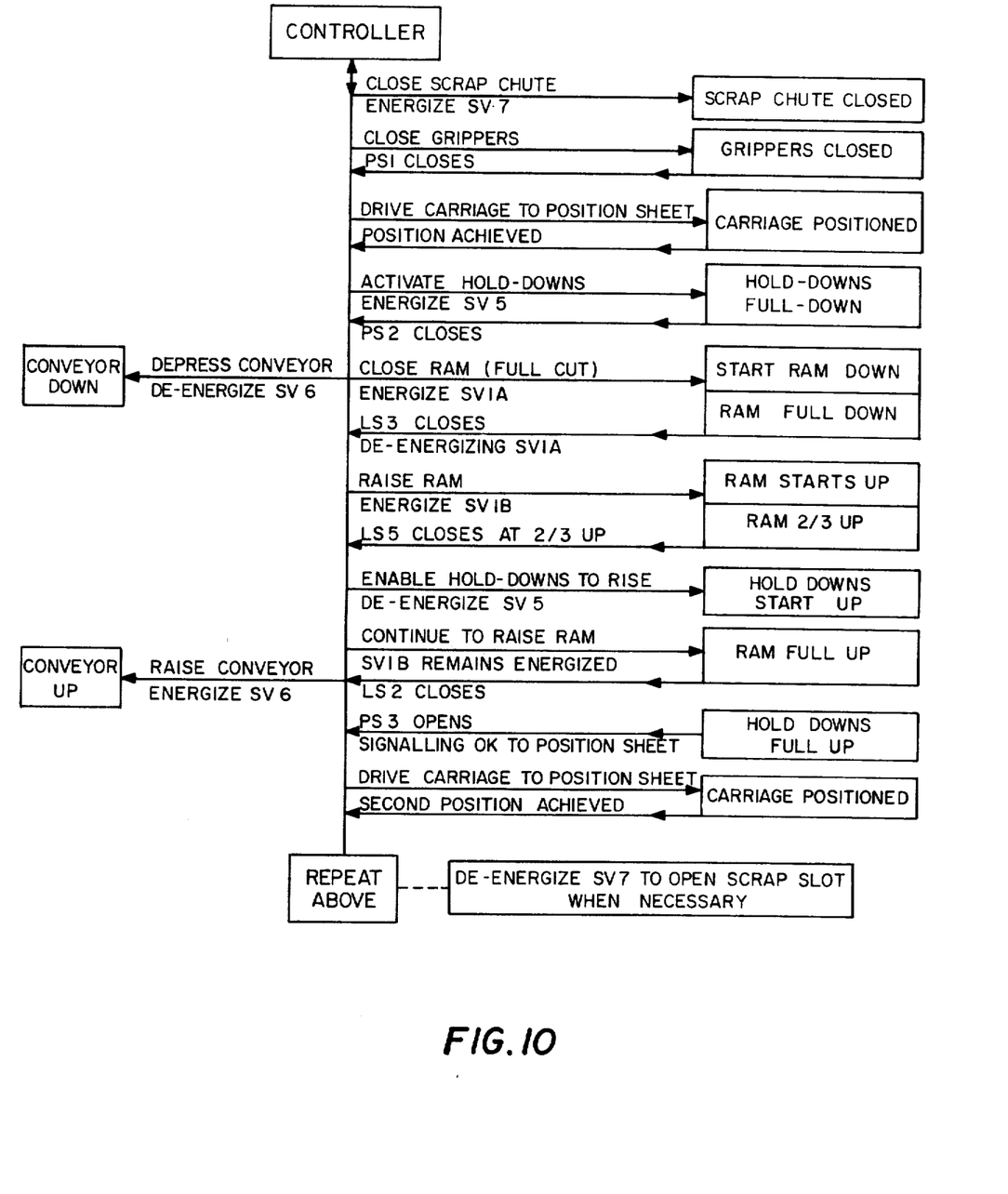
FIG. 10 is a functional block diagram of conveyor controls.

The sequence of events in one mode (automatic Full Cut) of operation of the machine, may be understood with the aid of FIG. 10. In this sequence, the sheet 19 is moved from a position such as shown by the solid outline in FIG. 1, for example, to a position such as shown by the dotted outline 19A in FIG. 1. While this operation is occurring, the blade ram drive cylinders are both in the condition of retraction of the piston rods therein, such as shown in FIGS. 2 and 9. In order to move the sheet, the grippers 22 are pressurized and, when full gripping pressure is achieved, pressure switch PS1 is actuated to enable carriage movement. The carriage to which the grippers are mounted is driven in the appropriate direction in order to locate the sheet as desired, such as in the position designated by 19A, for example. It should be understood that if the sheet is small enough to be handled manually, it can be moved into position in that manner, but the shearing machine of which the present invention is only a part, is intended to automatically position and shear material according to an optomizing program.

Once the sheet is in position, the holddown clamps 23 and 24 are energized. To energize them, the holddown control solenoid valve SV5 is energized and thereby shifted in the direction of arrow 103 to apply hydraulic fluid from the pump 67 through the check valve 76, lines 81, 94, 95, 96 and check valve 102 to the lines supplying The X-axis hold-down clamp cylinders 24, and the Y-axis hold-down clamp cylinders 23. As the pressure rises it will reach the limit of the pump 67 whereupon hydraulic fluid will continue to be added from pump 68 through check valve 71, line 72, and orifice 107. As the pressure rises, the pressure will close the check valve 102. Continued increase of pressure will occur until the limit established by the pressure relief valve 93 is reached. Meanwhile the pressure switch PS2 will be closed at the appropriate pressure levels, to initiate de-energization of the conveyor down solenoid SV6, whereupon the conveyor will be tipped downwardly as the piston rod is retracted in the tipping cylinder 53. Also, closure of PS2 initiates energization of the ram activating solenoid SV1A so the hydraulic fluid from pump 67 is applied through the valve SV1 to the head end of the cylinder 78, while the hydraulic fluid from the rod-end of the cylinder is discharged from valve SV1 to the sump. Accordingly, the ram starts to descend.

Ram position is sensed by a plurality of limit switches (LS2, LS3, LS5) which may be associated with a ram drive crankshaft or otherwise.

Once the ram has reached the bottom of the stroke, limit switch LS3 is closed and the valve solenoid SV1A is thereby de-energized, whereupon the ram descent terminates. At the same time, the solenoid SV1B is energized, whereupon the solenoid valve SV1 is shifted in the opposite direction and the hydraulic fluid is supplied to the rod end of the cylinder 78 while the head end is vented to the sump through the valve SV1. The ram is raised by the cylinder 78 and, when it has risen about two-thirds of its full stroke, the limit switch LS5 is made. This initiates de-energization of the hold-down control solenoid valve SV5, which is spring returned to the position shown in FIG. 9. The hold-down clamp piston return springs thereupon begin discharging the hydraulic fluid from the hold-down clamp cylinders to sump through the solenoid valve SV5 and the hold-downs begin to release the sheet. At this time the ram continues to rise until it is fully up, whereupon the limit switch LS2 is made.

When the limit switch LS2 is made, this initiates energization of the conveyor tipping solenoid valve SV6, whereupon the head end of the tipping cylinder 53 is supplied with hydraulic fluid, tipping the conveyor back up. When the hold-down cylinders 24 and 23 have been returned to their initial position by the return springs therein, the pressure in line 109 drops, to thereupon open the pressure switch PS3 and provide an "OK to position" signal to the sheet positioning apparatus and more particularly to the controls for the gripper carriages to which the grippers 22 are mounted, these portions not being shown because they are not a portion of the present invention. Nevertheless, the opening of pressure switch PS3 signals the fact that the hold-downs are clear of the sheet and the sheet can be moved safely. The condition of the conveyor in the up position facilitates the movement of the sheet and supports the portion which is inside the corner formed by the lower blades, thus preventing it from drooping and thereby enabling it to be properly located and securely held for the next cut to be made.

I claim:

1. A method of receiving and removing blanks sheared from a sheet in a shearing machine having a first lower blade, said method comprising the steps of:
   moving a portion of the sheet over said lower shear blade onto a conveyor portion behind said blade;
   clamping the sheet in front of the cutting edge of said blade;
   depressing the conveyor portion;
   closing a first upper blade with said lower blade to sever from the clamped portion of the sheet, the portion overhanging said depressed conveyor portion;
   conveying away the severed portion on said conveyor portion;
   maintaining the depressed conveyor portion at levels lower than said first upper blade at all times during closure of said blades;
   opening said first upper blade from said first lower blade;
   unclamping said sheet;
   moving another portion of said sheet over said first lower shear blade and over said conveyor portion;
   closing said upper blade with said lower blade to sever said another portion from said sheet; and
   horizontally shifting said conveyor portion from a first position to a second position to enable said severed another portion to fall past said conveyor portion.

2. The method of claim 1 and further comprising the steps of:
   opening said first upper blade from said first lower blade;
   horizontally returning said conveyor portion to said first position;
   unclamping said sheet;
   and moving still another portion of said sheet over said first lower shear blade and over said conveyor portion.

3. A method of receiving and removing blanks sheared from a sheet in a shearing machine having a first lower blade, said method comprising the steps of:
   moving a portion of the sheet over said lower shear blade onto a conveyor portion behind said blade;
   clamping the sheet in front of the cutting edge of said blade;
   depressing the conveyor portion;
   closing a first upper blade with said lower blade to sever from the clamped portion of the sheet, the portion overhanging said depressed conveyor portion;
   conveying away the severed portion on said conveyor portion;
   moving the sheet over a second lower shear blade while moving it over the first mentioned lower shear blade;
   and closing a second upper blade with said second lower blade, thereby severing the overhanging portion along intersecting lines;
   maintaining the depressed conveyor portion at levels lower than said first and second upper blades at all times during closure of said blades;
   opening said first and second upper blades from said first and second lower blades;
   unclamping said sheet;
   moving another portion of said sheet over said first and second lower shear blades and over said conveyor portion;
   closing said first and second upper blades with said first and second lower blades, respectively, to sever said another portion from said sheet; and
   horizontally shifting said conveyor portion on a diagonal with respect to the corner formed by said first and second lower shear blades, from a first position to a second position to enable said severed another portion to fall past said conveyor portion.

4. The method of claim 3 and further comprising the steps of:

opening said first and second upper blades from said first and second lower blades, respectively;

horizontally returning said conveyor portion to said first position;

unclamping said sheet;

and moving still another portion of said sheet over said first and second lower shear blades and over said conveyor portion.

5. In shearing apparatus having a first upper blade and a first lower blade, said blades being closable to shear a blank from a sheet disposed therebetween, and a conveyor adjacent said lower blade to receive a portion of said sheet thereon and to move the sheared blank away therefrom, the improvement comprising:

means coupled to said conveyor and to at least one of said shear blades and operable, when actuated, to move a portion of said conveyor in a direction generally parallel to motion of one of said blades, from a normal sheet supporting first position, to a second position clearing both of said blades when closed;

said conveyor including upper conveyor surface means substantially co-planar with an upper edge of said lower blade when said conveyor is in its said first position;

a portion of said conveyor upper surface means being disposed under said first upper blade when said conveyor is in said first position and when said conveyor is in said second position; and shifting means coupled to said conveyor and to said lower shear blade to move said conveyor away from said lower blade and open a scrap slot.

6. In shearing apparatus having a first upper blade and a first lower blade, said blades being closable to shear a blank from a sheet disposed therebetween, and a conveyor adjacent said lower blade to receive a portion of said sheet thereon and to move the sheared blank away therefrom, the improvement comprising:

means coupled to said conveyor and to at least one of said shear blades and operable, when actuated, to move a portion of said conveyor in a direction generally parallel to motion of one of said blades, from a normal sheet supporting first position, to a second position clearing both of said blades when closed;

said conveyor including upper conveying surface means substantially co-planar with an upper edge of said lower blade when said conveyor is in its said first position;

a second upper blade and a second lower blade, said second blades being disposed at an angle with respect to said first blades, the second upper blade being closable with said second lower blade to shear a sheet therebetween along a line intersecting the line along which said first blades shear, to thereby shear a corner in said sheet, said conveyor being adjacent both of said lower blades and inside a corner formed by said lower blades;

said lower blades being secured to a base said conveyor including a pivotable coupling to said base;

fluid operated drive means being coupled to said base and to said conveyor;

control means associated with said upper blades and responsive to movement thereof to actuate said fluid operated drive means;

a conveyor carriage mounted on said base, said conveyor being mounted to said carriage;

said fluid operated drive means being coupled to said conveyor through a link, and coupled to said base through said carriage, said drive means including a first cylinder mounted to said carriage, a rocker shaft mounted to said carriage, bell crank means on said rocker shaft and having an arm connected to the piston rod of said cylinder and another arm connected to said link, said cylinder being operable, when actuated, to rock said arms about said shaft and thereby rock said conveyor portion about said pivotable coupling;

said carriage being mounted to said base on linear guide means disposed at an angle with respect to said first and second lower shear blades, to facilitate movement of said conveyor away from said first and second lower shear blades on an angle to open scrap slots; and second cylinder means coupled between said base and said carriage and disposed parallel to said guide means and operable to move said carriage on said angle to open and close said scrap slots.

* * * * *